(12) United States Patent
Marchand et al.

(10) Patent No.: US 11,778,008 B2
(45) Date of Patent: Oct. 3, 2023

(54) METHOD FOR MANAGING ADAPTIVE PROGRESSIVE DOWNLOADING OF DIGITAL CONTENT WHICH IS BROADCAST IN REAL TIME

(71) Applicant: Orange, Issy-les-Moulineaux (FR)

(72) Inventors: Hervé Marchand, Chatillon (FR); Mathieu Rivoalen, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 17/597,025

(22) PCT Filed: May 12, 2020

(86) PCT No.: PCT/EP2020/063205
§ 371 (c)(1),
(2) Date: Dec. 22, 2021

(87) PCT Pub. No.: WO2020/259911
PCT Pub. Date: Dec. 30, 2020

(65) Prior Publication Data
US 2022/0321632 A1    Oct. 6, 2022

(30) Foreign Application Priority Data

Jun. 24, 2019  (FR) ..................... 1906834

(51) Int. Cl.
*G06F 13/00*    (2006.01)
*H04L 65/613*   (2022.01)
(Continued)

(52) U.S. Cl.
CPC .......... *H04L 65/613* (2022.05); *H04L 65/752* (2022.05); *H04L 65/764* (2022.05)

(58) Field of Classification Search
CPC ... H04L 65/613; H04L 65/752; H04L 65/764; H04L 65/612; H04L 65/70; H04L 65/80
(Continued)

(56) References Cited

U.S. PATENT DOCUMENTS 9,712,584 B2 * 7/2017 Karlsson .......... H04N 21/44209
10,506,002 B2 * 12/2019 Lou .......................... H04L 65/80
(Continued)

OTHER PUBLICATIONS

International Search Report for International Application No. PCT/EP2020/063205, dated Jun. 16, 2020.

*Primary Examiner* — Kenneth R Coulter
(74) *Attorney, Agent, or Firm* — Knobbe, Martens, Olson & Bear, LLP

(57) ABSTRACT

A method for managing adaptive progressive downloading of digital content broadcast in real time within a multimedia stream player terminal is disclosed. The method includes obtaining a description file of the digital content, including a list of time segments of the content to be downloaded each associated with several encoding rates of the content, and determining an encoding rate of the time segments to be downloaded for real time rendering of the content, according to a resource constraint of the terminal. If the determined encoding rate is less than a maximum encoding rate proposed in the description file, the method implements a selection of an option: of downloading the time segments at the determined encoding rate and rendering the content in real time; or of downloading the time segments at an encoding rate higher than the determined encoding rate and rendering the content offline.

8 Claims, 7 Drawing Sheets

(51) Int. Cl.
*H04L 65/752* (2022.01)
*H04L 65/75* (2022.01)

(58) Field of Classification Search
USPC ............... 709/231, 200, 217–219, 232–234
See application file for complete search history.

(56) References Cited

U.S. PATENT DOCUMENTS

| | | | |
|---|---|---|---|
| 10,567,816 B2* | 2/2020 | Mao | H04N 21/2381 |
| 10,650,621 B1* | 5/2020 | King | H04L 67/12 |
| 11,232,655 B2* | 1/2022 | Bhattacharyya | H04L 12/40032 |
| 11,418,823 B2* | 8/2022 | Mao | H04N 21/23424 |
| 2015/0350276 A1* | 12/2015 | Karlsson | H04N 21/44004 709/231 |
| 2016/0191594 A1* | 6/2016 | Moustafa | H04L 65/764 709/203 |
| 2016/0323606 A1* | 11/2016 | Mao | H04N 21/64707 |
| 2016/0337430 A1* | 11/2016 | Lou | H04L 41/147 |
| 2020/0273268 A1* | 8/2020 | Bhattacharyya | H04W 4/40 |

* cited by examiner

PARAMETRES
Configuration
　　　　Watch offline in high quality :
　　　　☐　Film
　　　　☐　TV show
　　　　☐　Documentary
　　　　☐　Television programme

Fig. 7

METHOD FOR MANAGING ADAPTIVE PROGRESSIVE DOWNLOADING OF DIGITAL CONTENT WHICH IS BROADCAST IN REAL TIME

CROSS-REFERENCE TO RELATED APPLICATIONS

This application is filed under 35 U.S.C. § 371 as the U.S. National Phase of Application No. PCT/EP2020/063205 entitled "METHOD FOR MANAGING ADAPTIVE PROGRESSIVE DOWNLOADING (HAS) OF DIGITAL CONTENT WHICH IS BROADCAST IN REAL TIME, CORRESPONDING ADMINISTRATOR, MULTIMEDIA STREAM PLAYER TERMINAL AND COMPUTER PROGRAM" and filed May 12, 2020, and which claims priority to FR 1906834 filed Jun. 24, 2019, each of which is incorporated by reference in its entirety.

BACKGROUND

Field

The field of the development is that of digital multimedia content, namely digital audio and/or video content, in particular content broadcast in real time or live. More specifically, the development relates to the optimisation of the management of adaptive progressive downloading (HTTP Adaptive Streaming (HAS)) in the context of watching digital content which is broadcast in real time regardless of variations in network conditions, in particular in terms of bandwidth.

Description of the Related Technology

Access to multimedia content, such as television or video on demand, from an Internet-type network, is possible today for most rendering terminals, in particular when they belong to a local communication network, such as a home network.

The terminal generally emits a request to a server, indicating the content chosen, and in return it receives a stream of digital data relating to this content. In the context of a local communication network, such a request passes through the network access gateway, for example the residential gateway.

The terminal is adapted for receiving this digital content in the form of multimedia data and for rendering it. This rendering consists in providing the digital content at the terminal in a form accessible to the user. For example, data received corresponding to a video are generally decoded, then rendered at the terminal in the form of a display of the corresponding video with its associated soundtrack. In the following, for the sake of simplicity, the digital content will be assimilated to a video and the rendering by the terminal, or consumption by the user of the terminal, to a display or playback on the screen of the terminal.

The broadcast of digital content on the Internet is often based on client-server protocols of the HTTP (standing for "Hyper Text Transport Protocol") family. In particular, downloading in progressive mode of digital content, also called streaming, allows to transport and consume the data in real time, that is to say that the digital data are transmitted over the network and rendered by the terminal as they arrive. The terminal receives and stores part of the digital data in a buffer memory before rendering it. This distribution mode is particularly useful when the rate available to the user is not guaranteed for the real time transfer of the video.

Adaptive progressive downloading, or HTTP Adaptive Streaming, abbreviated HAS, also allows to broadcast and receive data in different qualities corresponding for example to different rates. These different qualities are described in a parameter file available for download on a data server, for example a server of the content. When the rendering terminal wishes to access content, this description file allows to select the right format for the content to be consumed according to the available bandwidth or the storage and decoding capacities of the rendering terminal. This type of technique allows in particular to take account of the variations in bandwidth on the connection between the rendering terminal and the server of the content.

There are several technical solutions to facilitate the streaming distribution of such content, such as the proprietary solutions of Microsoft® Smooth Streaming, Apple® HLS, Adobe® HTTP Dynamic Streaming or the MPEG-DASH standard of the ISO/IEC organisation which will be described below. These methods propose to send the client one or more intermediate description files, also called documents or manifests, containing the addresses of the different segments to different qualities of the multimedia content.

Thus, the MPEG-DASH (for "Dynamic Adaptive Streaming over HTTP" standard), is a standard for audiovisual broadcasting format on the Internet. It is based on the preparation of the content in different presentations of variable quality and rate, cut into segments of short duration (of the order of a few seconds), also called "chunks". Each of these segments is made available individually by means of an exchange protocol. The primarily targeted protocol is the HTTP protocol, but other protocols (for example FTP) can also be used. The organisation of the segments and the associated parameters are published in a manifest in XML format.

The principle underlying this standard is that the MPEG-DASH client makes an estimate of the bandwidth available for the reception of segments, and, depending on the filling of its reception buffer, chooses, for the next segment to be loaded, a representation whose rate:
  ensures the best possible quality,
  and allows a reception delay compatible with the uninterrupted rendering of the content.

Thus, to adapt to variations in network conditions, particularly in terms of bandwidth, existing adaptive downloading solutions allow the rendering terminal to switch from one encoded version of the content at a certain rate, to another encoded version at another rate, during the download. Indeed, each version of the content is divided into segments of the same duration. To allow continuous rendering of the content on the terminal, each segment must reach the terminal before its scheduled rendering time. The perceived quality associated with a segment increases with the size of the segment, expressed in bits, but at the same time, larger segments require longer transmission time, and therefore have an increased risk of not being received on time for a continuous rendering of the content.

The rendering terminal must therefore find a compromise between the overall quality of the content, and its uninterrupted rendering, by carefully selecting the next segment to be downloaded, from the various encoding rates offered. For this purpose, there are different algorithms for selecting the quality of the content according to the available bandwidth, which may have more or less aggressive, or more or less secure, strategies.

In other words, in order to ensure a certain fluidity during playback, if the available bandwidth does not allow access to the best broadcast quality, the rendering terminal will use data streams of poorer quality. This technique thus allows to offer the best possible video quality while guaranteeing smooth playback or watching of the digital content.

The consumption of digital content in adaptive progressive downloading (HAS) is tending to be democratised. It is used in particular by many streaming services, but also by certain TV decoders, or set-top-box, which use it to access unserialised content, such as video on demand (VOD), delayed broadcasting of television programmes (Replay), or else Network PVR (for "Network Personal Video Recorder", that is to say a digital content recording service, carried out by the content provider itself rather than at the final user's home) type offers.

Furthermore, other devices such as real time multimedia stream player apparatuses also access digital content in progressive adaptive download mode for real time (or LIVE) television content. This is the case, for example, with the Chromecast® device developed by Google®, or the CléTV® from Orange®. Such apparatuses are conventionally connected to the HDMI port of a television and communicate, by Wi-Fi® connection, with another apparatus of the home communication network connected to a wide Internet-type communication network (residential gateway, computer, smartphone, tablet, . . . ), in order to render, on the television, the multimedia content received by a compatible software application. These apparatuses will be referred to below under the generic designation of HDMI Key.

In the following, for the sake of simplicity, the term "rendering terminal" will be assimilated to the association of a real time multimedia stream player (such as, for example, an Orange® CléTV®) and a terminal allowing to watch the content (such as for example a television). In another example, the rendering terminal corresponds to the association between a set-top box (STB), integrating a multimedia stream player in real time, and a television.

Even if the HAS downloading technique has the advantage of optimising the overall quality of the digital content broadcast LIVE depending on a constraint of available bandwidth, it is not without disadvantages. Indeed, HAS downloading does not natively allow the user to choose the quality of rendering of the content, which is systematically optimised, according to resource constraints of the multimedia stream player terminal, to allow a real time rendering of the content (for example, a television programme).

In particular, for some content which is broadcast LIVE, it is possible to imagine that the user wishes to access the best possible rate quality in order to benefit, for example, from digital content in high definition (HD), regardless of the bandwidth constraints. This is in particular the case, for example, when the user has a terminal offering a High Definition (HD) resolution, that is to say a screen resolution of at least 720p, that is to say 1280×720 pixels. Some HD televisions may offer, for the best televisions, a display resolution of 1920×1080 pixels ("Full HD"), or a resolution of 3840×2160 pixels, or four times the "Full HD" ("Ultra HD" televisions).

Thus, when the bandwidth is limited, HAS downloading does not allow the user to watch LIVE content at the best possible quality in order to take full advantage of the display quality of their HDTV, for example. It appears that the quality of the user's experience in watching LIVE content on an HD screen is not optimal.

There is therefore a need for a technique for managing adaptive progressive downloading (HAS) of digital content which is broadcast in real time, which does not have these various disadvantages of the prior art. In particular, there is a need for such a technique which allows to improve the quality of the user's experience when watching LIVE content, in particular, but not exclusively, on an HD screen.

SUMMARY OF CERTAIN INVENTIVE ASPECTS

The development responds to this need by proposing a method for managing adaptive progressive downloading (HAS) of digital content which is broadcast in real time, within a multimedia stream player terminal. Such a method comprises obtaining a description file of the digital content, comprising a list of time segments of the content to be downloaded each associated with several encoding rates of the content, and determining an encoding rate of the time segments to be downloaded for real time rendering of the content, according to a resource constraint of the terminal.

According to the development, if the determined encoding rate is less than a maximum encoding rate proposed in the description file, then the method implements a selection of an option: of downloading the time segments at the determined encoding rate and rendering the content in real time; or of downloading the time segments at an encoding rate higher than the determined encoding rate and rendering the content offline.

Thus, the development is based on a completely new and inventive approach of the adaptive progressive downloading of digital content which is broadcast in real time, or LIVE, by proposing to offer the user the possibility of watching the digital content offline, rather than in real time, in order to benefit from a rendering with a better level of quality, and thus offer a better quality of experience when watching this LIVE content.

For this purpose, according to the conventional HAS technique, the multimedia stream player terminal determines, according to the available bandwidth, the encoding rate of the time segments of the content broadcast LIVE to be downloaded. If this encoding rate is less than the maximum encoding rate of the time segments proposed in the description file, then the method according to the development offers the possibility of choosing among two options for downloading and rendering the content broadcast LIVE.

The first option corresponds to downloading the time segments at the determined encoding rate and rendering the content in real time. Indeed, the user may wish not to wait before watching the LIVE content and settle for watching it at any available quality, if, for example, they have little time and this content is only of little interest for them, or do not require a high quality of rendering. Conventionally, in order to ensure fluidity during playback, the terminal will then use data streams and "chunks" of poorer quality, if the available bandwidth does not allow access to the best quality offered in the manifest file.

However, to allow the user to watch LIVE content with a quality of rendering higher than that allowed by the available bandwidth, the second option offers the possibility of watching this LIVE content in offline mode. Thus, if the user has an HD television and wishes to watch a film broadcast LIVE or their favourite television show while taking full advantage of the resolution quality of their television screen, this second option is advantageous: the content is then rendered in offline mode in order to allow a smooth and better quality rendering of the content broadcast LIVE, throughout the duration of the latter.

Advantageously, this second option allows to improve the quality of the user's experience, in particular if they wish to take advantage of the HD of their screen for watching LIVE content.

According to a first feature of the development, the selection of one of these two options takes account of contextual information.

According to a first aspect, this contextual information results from a choice expressed by a user via an interface of the terminal.

Thus, the user can select, for example via the interface of the rendering terminal, whether they wish to choose the option of downloading at the best possible quality regardless of the bandwidth, and of watching the LIVE content in offline mode. This choice can be made content by content.

It can also be expressed by the user during a pre-configuration phase of the content broadcast service.

According to another feature, this contextual information takes account of a contextual component belonging to the group comprising: a nature of the content, a duration of the content, a schedule for broadcasting the content, a programming for recording the content.

Thus, it is possible to select a download at a better quality and an offline rendering, or a live rendering at the available quality, depending on the nature of the content, (for example a film or series, a television programme such as for example the television news), the schedule or the recording programming. This selection can be configured by the user during a pre-configuration phase, and be operated on the fly by the multimedia stream player terminal. It can also be operated by the multimedia stream player terminal, according to a pre-configuration carried out by the service provider.

The pre-configuration of this option is done for example via a user interface offering a drop-down menu.

According to one aspect of the development, the option of downloading the time segments at an encoding rate higher than the determined encoding rate and of rendering the content offline comprises: a phase of pre-storage of time segments at the higher encoding rate in a buffer memory of the terminal, for a pre-storage duration; a joint phase of storage of time segments at the higher encoding rate and offline rendering of the content from time segments extracted from the buffer memory, starting at the end of the pre-storage duration.

The pre-storage duration is determined so that the buffer memory is empty at the end of the offline rendering.

Advantageously, in order to ensure streaming of the LIVE content, when the user wishes to watch it at the best possible quality, the digital stream player will first pause the rendering of the content and fill its buffer memory with the time segments of the LIVE content at an encoding rate greater than the encoding rate determined according to the bandwidth availability.

This phase of filling the buffer memory takes place as long as the stream player has not stored enough content, or time segments, in memory to then ensure smooth playback.

Once the stream player has buffered, or stored, sufficient time segments of the content, the stream player then switches into an offline rendering phase, This offline rendering takes place in conjunction with the storage in buffer memory of the following time segments of the content.

Thus, during playback, the buffered video is consumed and the downloading of time segments representative of the broadcast video is continued, so as to continue filling the buffer memory.

According to another aspect of the development, the determination of the pre-storage duration takes account of at least one parameter belonging to the group comprising: the higher encoding rate, a duration of the content, an instant download rate of the terminal.

The duration of the digital content is obtained by the terminal by interrogating a server of programme guides which are broadcast in real time.

Thus, these parameters allow to determine the pre-storage duration necessary in order to store sufficient segments at a higher quality for an offline continuous rendering of the content.

In a particular embodiment of the development, at least one pre-storage duration is determined for at least one encoding rate higher than the determined encoding rate. The choice of the user, in the case of offline rendering, comprises a selection, via the interface, of a pre-storage duration. Advantageously, the user can choose between the real time rendering mode and the offline rendering mode, taking account of the pre-storage duration. Also, in the case where at least two pre-storage durations are determined for at least two encoding rates higher than said determined encoding rate, the choice of the user comprises a selection, via said interface, of one of said at least two pre-storage durations. The user can thus choose among several options of pre-storage duration according to their preferences or needs.

In a particular embodiment, the higher rate is the maximum encoding rate proposed in the description file.

The user can then watch a LIVE digital content for HAS downloading of their choice at the best quality offered, regardless of the bandwidth availability.

The development also relates to a computer program product comprising program code instructions for implementing an adaptive progressive downloading (HAS) management method, as described above, when it is executed by a processor. The development also relates to a recording medium readable by a computer on which is recorded a computer program comprising program code instructions for the execution of the steps of the method for managing adaptive progressive downloading (HAS) according to the development as described above.

Such a recording medium can be any entity or device capable of storing the program. For example, the medium may include a storage means, such as a ROM, for example a CD ROM or a microelectronic circuit ROM, or else a magnetic recording means, for example a USB key or a hard disk.

On the other hand, such a recording medium can be a transmissible medium such as an electrical or optical signal, which can be conveyed via an electrical or optical cable, by radio or by other means, so that the computer program it contains can be executed remotely. The program according to the development can in particular be downloaded over a network, for example the Internet network.

Alternatively, the recording medium can be an integrated circuit wherein the program is incorporated, the circuit being adapted to execute or to be used in the execution of the aforementioned display control method.

The development also relates to a device for managing adaptive progressive downloading (HAS) of digital content which is broadcast in real time, within a multimedia stream player terminal, comprising: a module for obtaining a description file of the digital content, comprising a list of time segments of the content to be downloaded each associated with several encoding rates of the content, a module for determining an encoding rate of the time segments to be downloaded for real time rendering of the content, according to a resource constraint of the terminal.

This device further comprises a module for selecting an option: of downloading the time segments at the determined encoding rate and rendering the content in real time; or of downloading the time segments at an encoding rate higher than the determined encoding rate and rendering the content offline.

Such a selection module is activated when the determined encoding rate is less than a maximum encoding rate proposed in the description file.

Finally, the development also relates to a multimedia stream player terminal, comprising an adaptive progressive download management device (HAS) as described above. The aforementioned management device, multimedia stream player and corresponding computer program have at least the same advantages as those conferred by the adaptive progressive downloading (HAS) management method according to the various embodiments of the present development.

BRIEF DESCRIPTION OF THE DRAWINGS

Other purposes, features and advantages of the development will emerge more clearly upon reading the following description, given by way of simple illustrative and non-limiting example, in relation to the figures, among which:

FIG. 7 illustrates an example of an interface for pre-configuring the content download options according to one embodiment of the development.

DETAILED DESCRIPTION OF CERTAIN ILLUSTRATIVE EMBODIMENTS

The general principle of the development is based, in the context of an adaptive progressive download of the HAS type, on the offer of a possibility of watching, in offline mode, digital content which is broadcast in real time, or LIVE, such as for example a television programme or a film broadcast live, in order to allow a user to benefit from a better rendering quality.

More particularly, the development consists in proposing several options for downloading and rendering the time segments of the content. Thus, when the encoding rate of the time segments of the content broadcast LIVE is less than an encoding rate, for example the maximum rate proposed in the description file of this content, in particular when the instant download rate of the stream player terminal does not allow to download the segments at the best quality offered, while it is possible to choose, based on contextual information: either to download the time segments at a reduced encoding rate, determined according to the resource constraint of the multimedia stream player terminal, for a real time rendering; or to download the time segments at an encoding rate greater than this rate, but for an offline rendering.

In the context of content broadcast LIVE for downloading called HAS, the development therefore allows the user in particular to choose to watch digital content broadcast LIVE, either in real time but at an encoding rate possibly limited by the available bandwidth, or in offline mode but with a higher quality and resolution.

The user is then no longer dependent on the rules for downloading in HAS, but can, if they wish, choose to impose the downloading of time segments at a higher quality, despite a limited bandwidth, at the cost, however, of an offline rendering of the content.

Thus, the user can watch their favourite television programme at a higher quality and thus, for example, take full advantage of the resolution quality of their television screen, if it offers HD quality or higher. Conversely, they can choose to watch the TV news live, for which the quality of rendering is less important to them.

Figure 1:
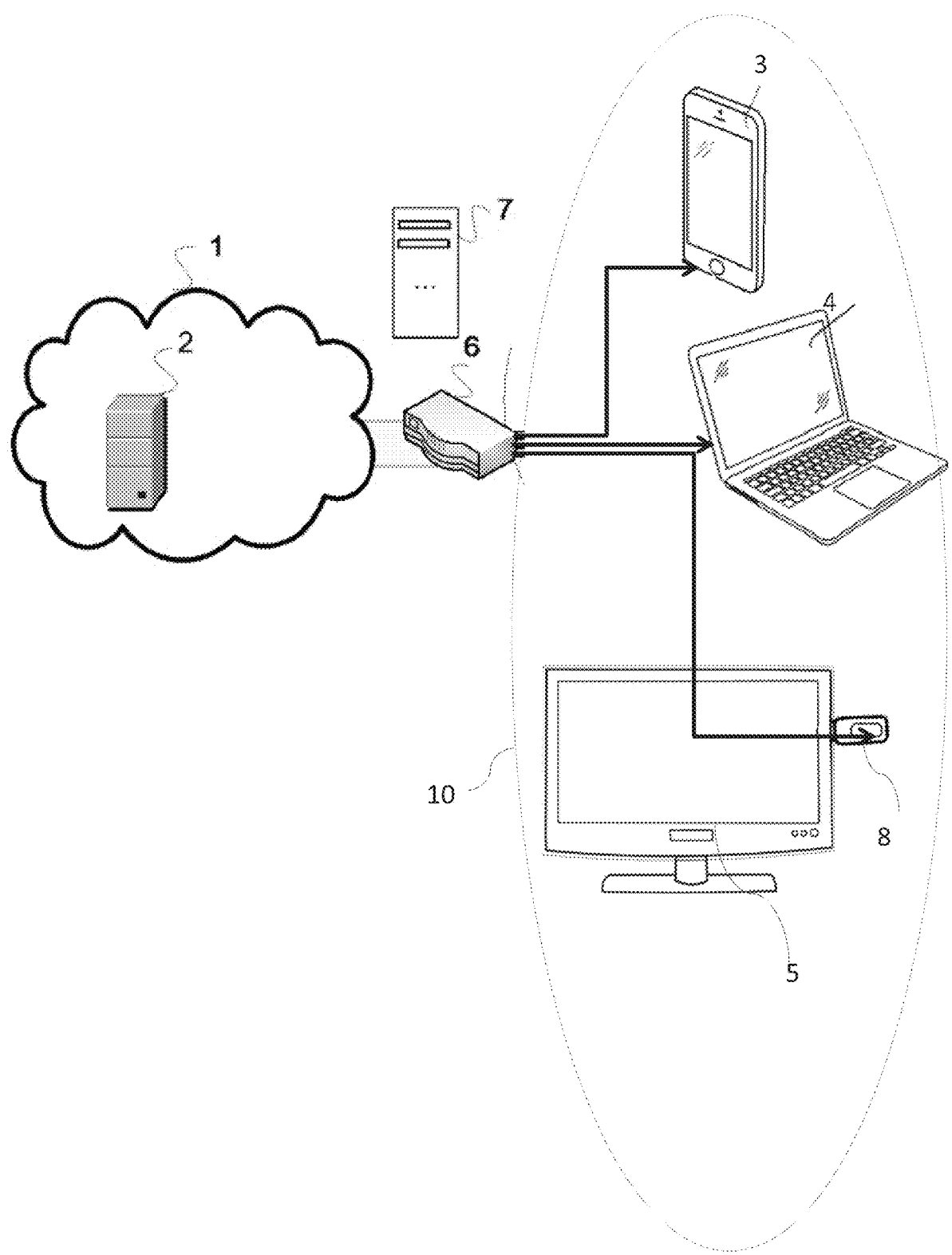
FIG. 1 shows a progressive download architecture based on the use of adaptive streaming according to one embodiment of the development.

In relation to FIG. 1, a progressive download architecture based on the use of adaptive streaming according to the development is now presented.

The Terminal 3, for example a smartphone, the terminal 4, for example a laptop computer, and the terminal 8, for example an HDMI key connected to a television 5, are in this example located in a local network (LAN, 10) controlled by a home gateway 6. The context of the local network is given as an example and could easily be transposed to a "best effort" type Internet network, a company network, etc.

A server of LIVE digital content in HAS, referenced 2, is located according to this example in the wide area network (WAN, 1) but it could equally well be located in the local network (LAN, 10), for example in the home gateway 6 or any other equipment capable of hosting such a content server. The HAS LIVE content server 2 for example receives digital television content channels from a broadcast television network, not shown, and makes them available to client terminals.

Client terminals 3, 4 and 8 can communicate with the HAS LIVE content server 2 to receive one or more content items (films, documentaries, advertising sequences, etc.).

It is common, in this client-server context, to use, in order to exchange data between the client terminals 3, 4 and 8 and the server 2, an adaptive progressive download technique, or "adaptive streaming", abbreviated as HAS based on HTTP protocol. This type of technique allows in particular to offer a good quality of content to the user, taking account of the variations in bandwidth which may occur on the connection between the client terminal 3, 4 and 8 and the service gateway 6, or between the latter and the HAS LIVE content server 2.

Conventionally, different qualities can be encoded for the same content of a channel, corresponding for example to different rates. More generally, a quality will be considered to refer to a certain resolution of the digital content (spatial, time resolution, level of quality associated with video and/or audio compression) with a certain rate. Each quality level is itself split on the content server into time segments (or "chunks" of content, these two words being used interchangeably throughout this document).

The description of these different qualities and the associated time segmentation, as well as the content chunks, are described for the client terminal and made available to it via their Internet addresses (URI: Universal Resource Identifier). All these parameters (qualities, addresses of the chunks, etc.) are generally grouped together in a parameter file, called a description file. It will be noted that this parameter file can be a computer file or a set of descriptive information about the content, accessible at a certain address.

The terminals 3, 4 and 8 have their own features in terms of decoding, display capability, etc. In a progressive adaptive download context, they can adapt their requests to receive and decode the content requested by the user at the quality that best suits them. In this example, if the content is available at rates of 500 kb/s (kilobits per second) (Resolution 1, or level 1, denoted D1), 1000 kb/s (D2), 2000 kb/s (D3) and the client terminal has a bandwidth of 3000 kb/s, it can request the content at any rate below this limit, for example 2000 kb/s. In general, the content number i with the quality j (for example the j-th quality level Dj described in the description file) is denoted "$Ci@Dj$".

The service gateway 6 is in this example a domestic gateway which ensures the routing of data between the wide area network 1 and the local network 10, manages the digital content by ensuring in particular their reception from the network and their decoding thanks to the decoders that are here assumed to be integrated into the gateway 6 or into the client terminals 3, 4 and 8. Alternatively, the decoders may be located elsewhere in the wide area 1 or local area 10 network, in particular at an STB (Set-Top-Box) type element (not shown) associated with a television.

In this example, to watch content, the terminal 3, 4 or 8 first interrogates the service gateway 6 to obtain an address of the description document 7 of the desired content (for example, C1). The service gateway 6 responds by providing the terminal with the address of the description file 7. In the following, it will be assumed that this file is a manifest type file according to the MPEG-DASH standard (denoted "C.mpd") and reference will be made indifferently, depending on the context, to the expression "description file" or "manifest".

Alternatively, this file can be retrieved directly from an Internet server which is local or external to the local network, or be already on the service gateway or on the terminal at the time of the request.

An example of a manifest file (MPD) conforming to the MPEG-DASH standard and including the description of content available in three different qualities (N1=512 kb/s, N2=1024 kb/s, N3=2048 kb/s) of the content fragmented is presented in Annex 1. This simplified manifest file describes digital content in XML syntax (standing for "eXtended Markup Language"), comprising a list of content in the form of chunks conventionally described between an opening tag (<SegmentList>) and a closing tag (</SegmentList>). Cutting into chunks allows in particular to adapt finely to fluctuations in the bandwidth. Each chunk corresponds to a certain duration ("duration" field) with several quality levels and allows to generate their addresses (URL—Uniform Resource Locator). This generation is done in this example using the elements "BaseURL" ("HTTP://server.com") which indicates the address of the content server and "SegmentURL" which lists the complementary parts of the addresses of the different chunks:

"C1_512 kb_1.mp4" for the first chunk of the content "C1" at 512 kilobits per second ("kb") in the format MPEG-4 ("mp4"), "C1_512 kb_2.mp4" for the second chunk, etc.

Once it has the addresses of chunks corresponding to the desired content, the service gateway 6 proceeds to obtain the chunks by downloading at these addresses. It should be noted that this download takes place here, conventionally, through an HTTP URL, but could also take place through a universal address (URI) describing another protocol (dvb://mycontentsegment for example).

It is assumed here that the HDMI key 8 is connected to the television 5 by plugging to the HDMI port of the latter, and is used to render, on the screen of the television 5, a television programme broadcast live, such as for example a film, a series, a television programme, an advertising sequence, etc. Hereafter, this television programme is referred to as LIVE content C1. Such LIVE content C1 is described in a manifest file 7.

In this example, the HDMI key 8 is connected via WiFi® directly to the residential gateway 6. Alternatively, the HDMI key 8 could also be connected via WiFi® to another portable device on the home network, for example to the laptop computer 4 or to the smartphone 3, through which it could access the extended communication network 1.

The HDMI key 8 can also be controlled by the user by means of the smartphone 3, on which a software application for controlling the HDMI key 8 is installed.

The content chunks obtained by the residential gateway 6 are for example transmitted over WiFi® to the HDMI key 8, which controls their display on the television screen 5, for rendering to the user.

Figure 2:
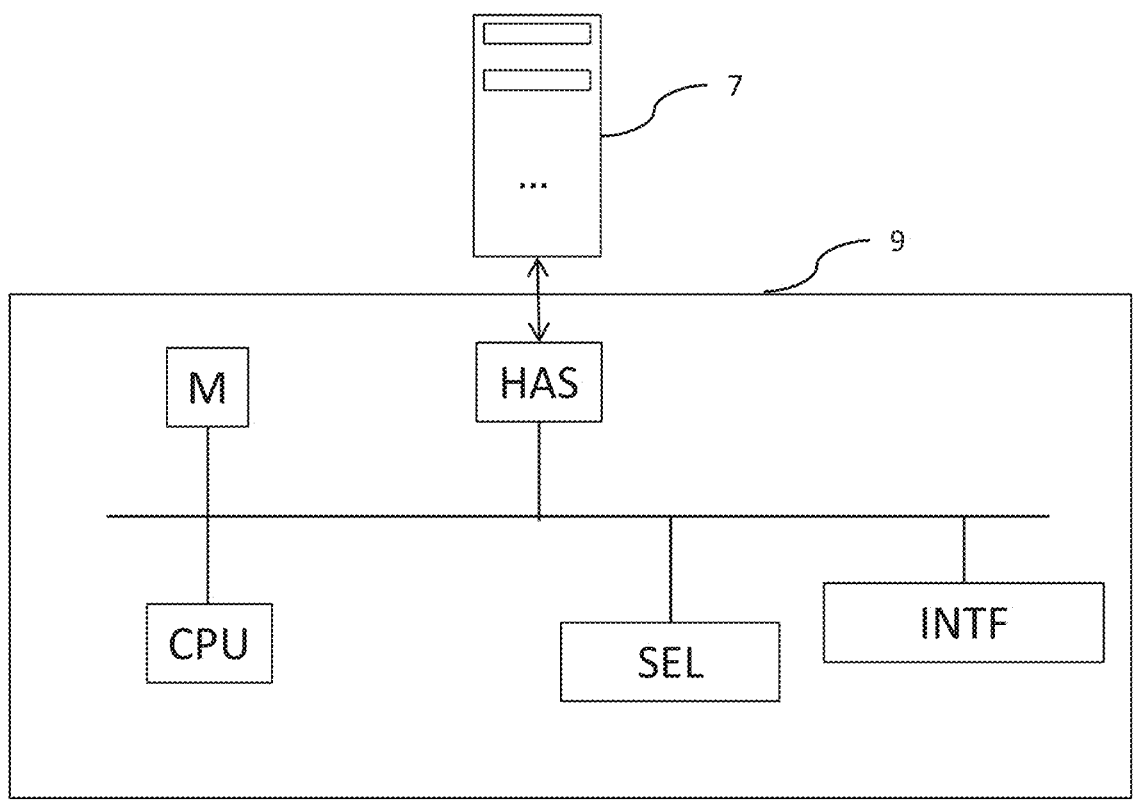
FIG. 2 schematically illustrates the hardware structure of a multimedia stream player terminal incorporating an adaptive progressive download management device according to one embodiment of the development.

FIG. 2 shows an architecture of a multimedia stream player terminal 9, or stream player 9, according to one embodiment of the development, integrated for example into the gateway 6 or into the terminals 3, 4, or 8 of FIG. 1. Alternatively, this stream player is integrated into an element of STB type associated with a television (not shown).

It conventionally comprises memories M associated with a processor CPU. The memories can be of the ROM (standing for "Read Only Memory") or RAM (standing for "Random Access Memory") or else Flash type. The multimedia stream player 9 comprises a HAS adaptive progressive downloading module capable of requesting a progressive download of one of the content items at one of the qualities proposed in a description file 7. This description file 7 can be recorded for example in the memories M of the multimedia stream player 9 or be located outside.

The multimedia stream player 9 further comprises a module SEL for selecting an option of downloading and rendering LIVE content C1. This module SEL is able, on the one hand, to determine whether the encoding rate determined according to the bandwidth is less than a maximum encoding rate proposed in the description file, and on the other hand, to operate a selection, based on contextual information, of an option:

of downloading the time segments at the determined encoding rate according to the bandwidth and rendering the content in real time (hereinafter referred to as the first option); or of downloading the time segments at an encoding rate higher than the determined encoding rate and rendering the content offline (hereinafter referred to as the second option).

As part of the second option, the module SEL then controls the adaptive progressive downloading module HAS, in order to force the latter to request the downloading of higher quality time segments. The module SEL is also capable of controlling the offline rendering of the LIVE content C1, for example on the television 5.

The choice of the first or the second option can be made by the user of the terminal 9, through a dedicated interface, content by content.

It can also be pre-configured by the user, through this interface, for example according to the nature of the content, or its broadcast schedule (for example, the TV news must always follow the first option, and be broadcast in real time, to the detriment of its quality of rendering, but animal documentaries must be rendered in maximum quality, even if their rendering must be offline).

This pre-configuration can also be performed by the HAS service provider, for example the operator of the domestic gateway 6, at least for certain types of content or certain contexts: for example, for LIVE content for which the user has programmed a recording, the choice of the second option can be adopted by default, to allow an improvement in the quality of the user experience during the offline rendering of the content. In order to allow the user to make a choice as to the options for downloading and rendering the time segments of the content C1, the module SEL therefore interacts with a user interface INTF of the multimedia stream player 9. This user interface offers for example the display of a pop-up window on the screen of the television 5 or the terminals 3 and 4, offering, optionally, live rendering at moderate quality, or offline rendering with higher quality. Preferably, this second option is accompanied by an indication given to the user of the expected waiting time before the start of the offline rendering of the content.

Indeed, within the context of the second option, the module SEL is also able to determine a pre-storage duration, in the buffer memory of the multimedia stream player 9, of the higher quality time segments to be downloaded.

This pre-storage duration corresponds to the minimum pause time for playback, so that the latter then takes place in a fluid manner throughout the rendering of the content. At the end of this pre-storage duration, it is ensured that enough time segments have been stored, so that the offline rendering of the content can begin, without then being interrupted until the end of the content.

The multimedia stream player 9 according to the development can also contain other modules (not shown) such as a hard disk for storing video chunks, a content access control module, a module for processing controls received from a tablet, a smartphone, or a remote control, through which the user can control its operation, etc.

It will be noted that the term module can correspond just as well to a software component as to a hardware component or a set of hardware and software components, a software component itself corresponding to one or more computer programs or subprograms or more generally to any element of a program capable of implementing a function or a set of functions as described for the concerned modules. In the same way, a hardware component corresponds to any element of a hardware assembly capable of implementing a function or a set of functions for the concerned module (integrated circuit, integrated circuit card, memory card, etc.).

More generally, such a stream player 9 comprises a random access memory (or a RAM memory), a processing unit equipped for example with a processor CPU, and controlled by a computer program, representative of the adaptive progressive download management module HAS, stored in a ROM memory (for example a hard disk). Upon initialisation, the code instructions of the computer program are for example loaded into the random access memory before being executed by the processor CPU of the processing unit. The random access memory contains in particular the manifest description file 7. The processor of the processing unit controls the comparison of the encoding quality of the time segments to be downloaded with the maximum encoding rate proposed by the description file 7, the display of pop-up windows or a drop-down menu on the screen of the television 5 or the terminals 3 or 4, the selection based on contextual information:

of an option of downloading time segments at a limited encoding rate, determined according to the resource constraint, for real time rendering; or of an option of downloading the time segments at an encoding rate higher than the determined rate according to the resource constraint, but for offline rendering;

and the emission of corresponding controls to the client module HAS.

FIG. 2 only illustrates one particular way, among several possibilities, of making the stream player 9, so that it performs the steps of the method detailed below, in relation with FIGS. 3A and 3B (in any one of the different embodiments, or in a combination of these embodiments). Indeed, these steps can be performed either on a reprogrammable computing machine (a computer PC, a processor DSP or a microcontroller) executing a program comprising a sequence of instructions, or on a dedicated computing machine (for example a set of logic gates such as an FPGA or ASIC, or any other hardware module).

Figure 3A:
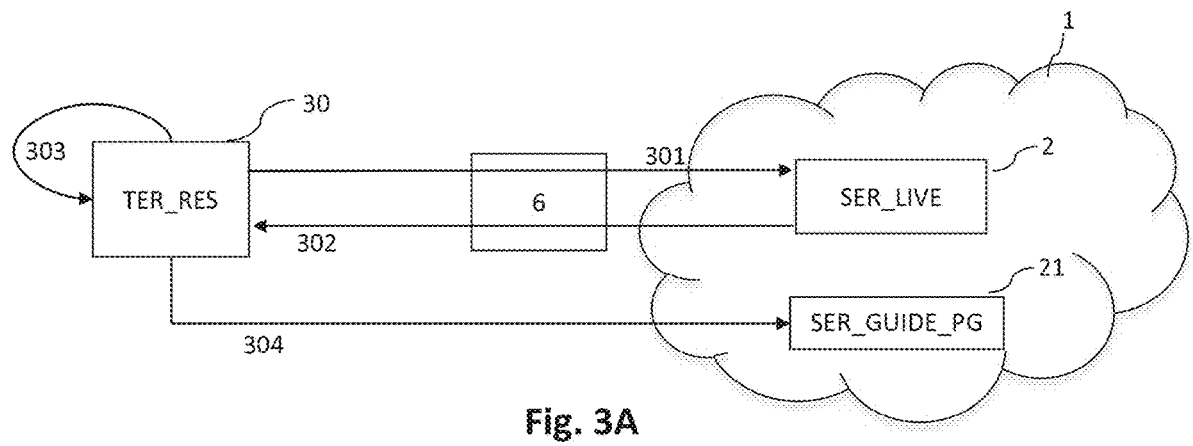
FIG. 3A illustrates an exemplary embodiment of a method for managing adaptive progressive downloading (HAS) of digital content broadcast LIVE by a multimedia stream player terminal of FIG. 2 associated with a client terminal.
Figure 3B:
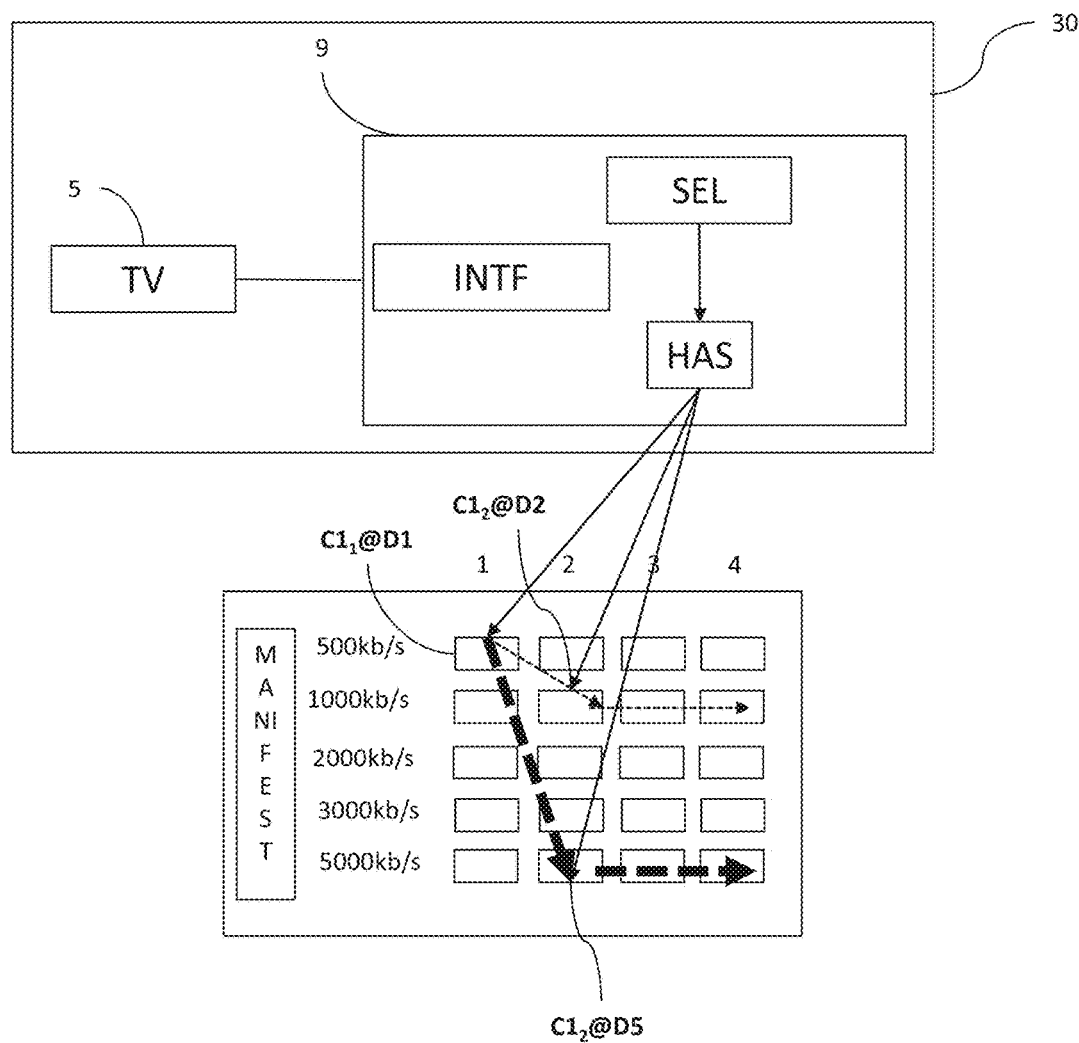
FIG. 3B shows a selection example of a segment of digital content broadcast LIVE during the implementation of a method for managing adaptive progressive downloading (HAS) of digital content broadcast LIVE according to FIG. 3A by the digital stream player terminal of FIG. 2.

With reference to FIG. 3A, an example of implementation of a method for managing adaptive progressive downloading (HAS) of digital content broadcast LIVE according to the development is now presented.

In this example, the user wishes to access content broadcast LIVE and in "http Adaptive Streaming" (HAS), such as a television programme, a series or a film, on their television 5 connected to an HDMI key 8 incorporating a multimedia stream player 9 according to FIG. 2. The multimedia stream player 9 comprises a selection module SEL, based on contextual information, of an option of downloading and rendering the content broadcast LIVE, a module HAS and a user interface INTF. The HDMI key 8 can be controlled via a remote control or via a software control application of a smartphone 3.

In order to watch content broadcast LIVE, the user, via the rendering terminal 30, that is to say the association of the television 5 and the HDMI key 8 forming a stream player 9 for example, sends during a step 301 a request, which passes through the gateway 6, indicating the chosen content to the HAS LIVE content server 2.

In a step 302, the HAS LIVE content server 2 sends in response to this request a data stream representative of the chosen content. The HAS LIVE content server 2 exposes LIVE content C1 in the form of chunks C1i@Dj encoded at different encoding rates Dj, where the index i designates a time identifier, or position, of the chunk C1i@Dj. The stream player 9 then begins to retrieve the time segments of the LIVE content C1.

This data stream is retrieved by the HAS module of the multimedia stream player 9, for example the HDMI key 8, which controls its rendering on the television 5 for watching by the user. According to the prior art, the HAS module is responsible for retrieving the chunks from the HAS LIVE content server 2 by choosing the video quality Dj according to the available network resource. The way in which the HAS client module chooses the encoding rate of the next video chunk to be downloaded is not described here in more detail: there are indeed many algorithms allowing this choice to be made, the strategies of which are more or less secure or aggressive. It is recalled, however, that, most often, the general principle of such algorithms is based on the downloading of a first chunk at the lowest encoding rate proposed in the manifest, and on the evaluation of the time for retrieving this first chunk. Based on this, the HAS client module evaluates whether, depending on the size of the chunk and the time taken to retrieve it, the network conditions allow the next chunk to be downloaded at a higher encoding rate. Some algorithms are based on a gradual increase in the quality level of the downloaded content chunks; others propose riskier approaches, with jumps in the levels of the encoding rates of successive chunks.

During a step not shown, the HAS module retrieves the manifest file 7 in order to discover the available chunks of the content broadcast LIVE C1, and the various associated video qualities Dj.

In a step 303, the module SEL of the stream player 9 determines whether the encoding rate of the time segments of the content downloaded in HAS is less than a maximum encoding rate proposed in the description file of the LIVE content C1.

In other words, the module SEL detects for example that it cannot access the best quality of the LIVE content C1, the download rate not being sufficient to play the LIVE content C1 at the best possible quality in real time.

In this case, the stream player 9, via the module SEL which interacts with a user interface INTF, then offers the user to select their preferred choice, that is to say: either access the content without prior buffering, but in a limited quality, or on the contrary tell them that if they pause their playback during a filling time of the buffer memory ("Tbuffering"), corresponding to a pre-storage duration of time segments at higher rate, they can then watch LIVE content in higher quality. Alternatively, several distinct rendering qualities of the content, associated with several distinct pre-storage durations of segments in the buffer memory, can be offered to the user.

Thus, when the module SEL of the stream player 9 detects that the encoding rate of the time segments determined according to the availability of the bandwidth is less than an encoding rate proposed in the description file 7, the maximum rate in this example, then the module SEL proposes to select, based on a contextual information, an option:
- of downloading the time segments at the determined encoding rate and rendering the content in real time (first option);
- of downloading the time segments at an encoding rate higher than the determined encoding rate and rendering the content offline (second option).

In other words, the module SEL, via a user interface INTF, offers the user to choose whether they wish to opt for a real time rendering with a limited quality of time segments, or for an offline rendering with a higher quality of time segments.

The first option allows smooth real time rendering of the LIVE content C1 by adapting the encoding rate according to the bandwidth offered by the HAS download. The video quality of the LIVE content C1 is therefore imposed on the user by the HAS download.

On the contrary, if the user wishes to access higher video quality, without having the necessary bandwidth to ensure smooth playback, the second option allows them to dispense with this adaptation of the video quality in HAS download. The user can for example decide to choose the second option if they wish to take full advantage of the resolution quality of the screen on which they are watching the LIVE content C1. This is the case when the LIVE content C1 is watched for example on an HD television.

The HAS download management method according to the development allows the user to override the HAS download rules and force the download to a higher rate quality, or even to the maximum rate quality proposed in the description file. Thus, the user can watch LIVE content C1 at higher quality and enjoy HD on their television 5 for example.

In an example illustrated below in relation to FIG. 3B, the LIVE content C1 is for example offered in the form of chunks with a first encoding rate D1=500 kb/s, a second encoding rate D2=1000 kb/s, a third encoding rate D3=2000 kb/s, etc. When the user chooses the first option, that is to say in a conventional HAS operating mode, the HAS module downloads, for example, successive chunks C11@D1 (that is to say the first time chunk at an encoding rate of 500 kb/s), then C12 @ D2 (that is to say the second time chunk at an encoding rate of 1000 kb/s) etc.

In this example, the bandwidth does not allow to download the time segments at the best proposed quality, that is to say at a maximum encoding rate of 5000 kb/s. In this case, the HAS module downloads a first chunk C11@D1 (that is to say the first time chunk at an encoding rate of 500 kb/s), then the following chunk C12 @D2 (that is to say the second time chunk at an encoding rate of 1000 kb/s), then finally the following chunks at the same encoding rate.

The various chunks downloaded by the HAS client module are transmitted to the television 5 via the HDMI key 8 for example for being rendered to the user.

The algorithm implemented by the HAS client module to determine which chunk at which encoding rate should be downloaded in normal operating mode (that is to say outside the periods when it is controlled by the module SEL for selecting a downloading and rendering option) can be one of the algorithms already existing in the prior art. This algorithm will therefore not be described in more detail here.

When the user chooses the second option, that is to say in an operating mode where the user decides to watch the LIVE content C1 offline, but at a higher quality, the module SEL controls the HAS module which operates the downloading, for example, of the successive chunks C11@D1 (that is to say the first time chunk at an encoding rate of 500 kb/s), then C12 @D5 (that is to say the second time chunk at an encoding rate of 5000 kb/s). Thus, the user, by choosing to watch in offline mode at a higher quality, forces the downloading of higher quality chunks, that is to say at an encoding rate comprised between 1000 kb/s and 5000 kb/s.

In a variant, the higher encoding rate is the maximum rate proposed in the description file, namely 5000 kb/s in this example. In order to ensure continuously playing LIVE content C1 at a higher quality, regardless of the availability of the bandwidth, the content is no longer rendered in real time, but in offline.

Figure 4:
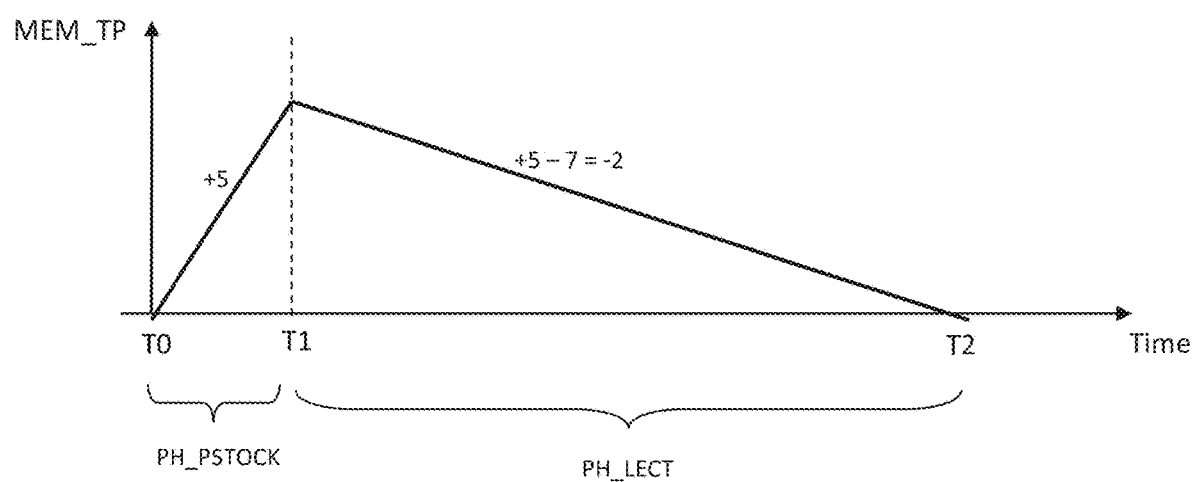
FIG. 4 schematically illustrates the implementation of an option of downloading time segments at an encoding rate greater than a determined encoding rate according to a resource constraint, and of rendering the digital content broadcast LIVE offline.

In connection with FIG. 4, an example of the implementation of the option of downloading the time segments at an encoding rate greater than a determined encoding rate according to a resource constraint, and rendering the LIVE content offline (second option).

This second option takes place in two phases.

It first of all comprises a phase of pre-storage (PH_P-STOCK) of the time segments at the higher encoding rate chosen by the user in the buffer memory of the multimedia stream player 9, for a pre-storage duration ranging from T0 to T1 for example. The real time rendering of the content is then interrupted during this pre-storage phase (playing the paused content). Then, when enough time segments are stored, that is to say stored in the buffer memory, to ensure smooth playback of the content C1, the playback of the content can resume (phase ranging from T1 to T2).

As part of the second option, in order to ensure the fluidity of the offline rendering of the LIVE content C1, the module SEL of the multimedia stream player 9 determines the duration T1-T0 of pre-storage of the time segments in the buffer memory of the multimedia stream player 9.

This pre-storage duration is determined taking account of:
the encoding rate of the time segments to be downloaded,
the instant download rate of the terminal, that is to say, the resource constraint, such as the availability of bandwidth,
the duration of the content.

This duration of the content C1 is determined during a step 304 illustrated in FIG. 3A during which the stream player retrieves from the server of the programme guides 21 the end time of the content C1 being broadcast.

In a variant, the stream player 9 retrieves a programme guide from which it then extracts the end time of the LIVE content C1. This end time allows to calculate, according to the duration of the content C1, the amount of time segments to be buffered before starting the offline playback. Indeed, in a particular embodiment of the development, this pre-storage duration is determined so that the buffer memory is empty at the end of the offline rendering of the content C1.

At the end of this pre-storage duration begins a subsequent joint phase (PH_LECT) of storage of time segments at the chosen higher encoding rate and of offline rendering of the content from time segments extracted from the buffer memory. This phase therefore comprises a rendering of the time segments stored in the buffer memory in parallel with the downloading of subsequent time segments.

Taking account of the resource constraints of the multimedia stream player terminal, the download speed of the time segments is lower than the content rendering speed.

In other words, during playback, the buffer memory gradually empties because the speed of content retrieval is less than the speed of clearing the buffer memory.

Thus, during playback, the buffered video is consumed and the downloading of time segments representative of the broadcast video is continued, so as to continue to fill the buffer memory.

The resumption of the playback of the content C1, at the instant T1, is only authorised from the moment when sufficient time segments have been stored in the buffer memory to ensure smooth playback of the content at the chosen encoding rate, until the end of the content, taking account of the instant download rate of the terminal.

In this example, after identification by the module SEL of a problem of access time to the best possible quality time segments proposed in the description file 7, the stream player 9 pauses the playback of the content and stores in buffer memory of the time segments of the content C1 which is broadcast. This buffering takes place as long as enough time segments have not been stored in memory to then ensure smooth playback. Once the terminal has stored sufficient segments of the content in buffer memory, the stream player terminal then switches to offline playback mode. During the offline rendering of the content already stored in the buffer memory, the following time segments of the LIVE content C1 are continued to be downloaded.

When the buffer memory is completely empty at the end of playback, the stream player then switches to conventional adaptive streaming mode.

In the example illustrated in FIG. 4, the instant download rate measured by the stream player terminal 9 is 5 Mb/s. The maximum quality of the LIVE content C1 available in the description file 7, that is to say the maximum encoding rate of the time segments of the content C1, is 7 Mb/s. After retrieving the end time of the LIVE programme being broadcast, the stream player 9 determines that the content C1 (for example a film) must end in 60 min.

The stream player 9 must store in buffer memory a certain amount of content before starting the offline playback. In this example we have:
Tbuffering: the buffering time between T0 and T1, also called pre-storage duration (PH_PSTOCK);
Tplaying: the offline playback time of the content C1 between T1 and T2 (PH_LECT), that is to say the duration of the content to be played, in this example 60 min.

During the pre-storage phase, the volume of content that can be stored in the buffer memory of the multimedia stream player terminal 9 is equal to Tbuffering×5 Mb/s.

During the subsequent joint phase of storage and offline rendering of the content, of duration Tplaying, a volume of content is stored in the buffer memory (namely the following time segments) at 5 Mb/s, while another volume of content is retrieved from this buffer memory (that is to say the content rendered offline to the user) at 7 Mb/s. The resulting content volume is equal to Tplaying×(5 Mb/s−7 Mb/s).

In a preferred embodiment of the development, the aim is to start the playback when the buffer memory is just sufficiently full to arrive with an empty buffer memory at the end of playback.

Therefore, we have:

$$5 \times Tbuffering - 2 \times Tplaying = 0.$$

It is deduced that:

$$Tbuffering = 2 \times Tplaying / 5$$

The minimum time to fill the buffer memory before being able to authorise the playback of the content to ensure rendering in the highest quality throughout the content is therefore generally:

$$Tbuffering = ((MaxRate - DownloadRate)/DownloadRate) * ContentLength \text{ with:}$$

"MaxRate" which is the maximum encoding rate of the content, retrieved in the description file 7. In this example the MaxRate is 7 Mb/s.
"DownloadRate" which is the download rate, that is to say the available bandwidth of the communication network, measured by the stream player 9. In this example the DownloadRate is 5 Mb/s "ContentLength" which is the duration of the content retrieved from the guide server of the LIVE programmes 21. In this example the ContentLength is 60 min.

Note that the maximum encoding rate MaxRate can be replaced in the formula by another rate, lower than this maximum encoding rate, but greater than the encoding rate authorised according to conventional HAS technology by the resource constraint of the terminal, for example SupRate.

Thus, in the example above, the pre-storage duration of the higher quality time segments in the buffer memory, that is to say the pause or waiting time before resuming the playback of the content, is of:

$$Tbuffering=((7-5)/5)*60=24 \text{ min}$$

The user must therefore wait 24 min before starting the offline playback of the content at the best possible quality for smooth playback throughout the rendering.

In one embodiment of the development, the user is therefore offered, on the interface INTF, a choice between:
live rendering of the content C1 at 5 Mb/s;
offline rendering of the content C1 at 7 Mb/s, available after a waiting time of 24 minutes.

It is also possible to propose for example an intermediate solution, namely an offline rendering of the content C1 at 6 Mb/s, available after a waiting time of 12 minutes.

Depending on their personal constraints and preferences, the user can choose one of these three options, via the interface INTF.

Figure 5A:
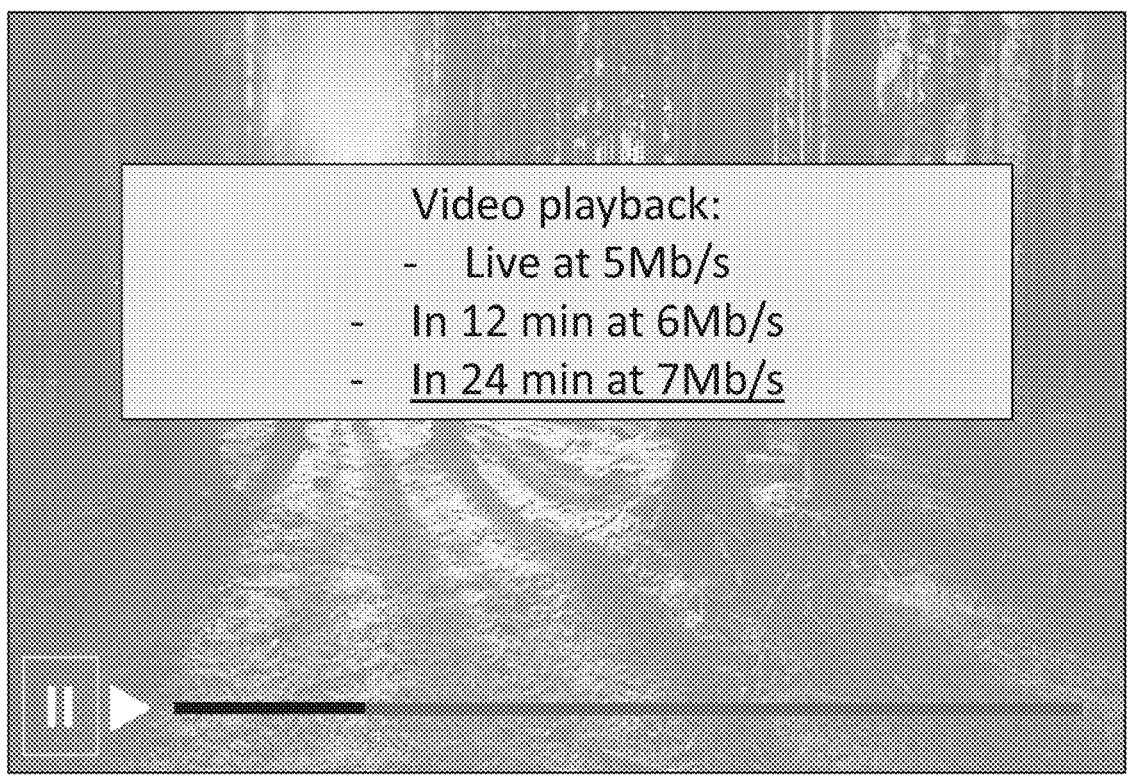
FIG. 5A illustrates an example of display of a request message for selecting a waiting time before resuming the rendering of the digital content broadcast LIVE according to one embodiment of the development.

In connection with FIG. 5A, an example of display of a message offering download options to the user is now presented.

In the example related to FIG. 4, after having selected the second option of downloading the content C1 at a higher quality and offline rendering, the module SEL determines that the pre-storage duration of the time segments to ensure smooth playback of the content at the maximum encoding quality is for example 24 min, or 12 min at an intermediate encoding quality, but higher than the quality of rendering conventionally offered in HAS.

The module SEL, via the user interface INTF, offers the user to choose one of the following download options:
live rendering of the content C1 at 5 Mb/s ("Video playback: live at 5 Mb/s");
offline rendering of the content C1 after 12 minutes at 6 Mb/s ("Video playback: in 12 min at 6 Mb/s");
offline rendering of the content C1 after 24 minutes at the maximum possible encoding quality, that is to say 7 Mb/s ("Video playback: in 24 min at 7 Mb/s");

This proposal can be made, for example, by displaying a message in the form of a pop-up window on the user's screen. The user chooses, for example by acting on the remote control associated with the television 5, which of these three options suits them best.

In this example, the user considers the waiting time of 24 min to be suitable. It will therefore continue the playback of the LIVE content C1 at the maximum quality proposed by the description file, here 7 Mb/s, after a 24-minute pause.

In another example, the user considers that this waiting time is too long for them (for example because they must leave their home in 1h15) and therefore decide to choose an offline rendering of 12 minutes of the content C1, at the intermediate quality of 6 Mb/s, which constitutes a good compromise between their personal constraints (they will have finished watching C1 in 1h12) and the quality of rendering the content. In this case, the rendering is made at a quality lower than the maximum quality proposed in the description file, but higher than the live rendering quality of the content.

This choice of a live or offline rendering can be made content by content, or result from a pre-configuration, which can be operated by the user themself, or by the service provider. Such a pre-configuration is described in more detail below in relation to FIG. 6.

In such a context of pre-configuration of an offline rendering for a given content, it is however possible to imagine that the user is informed of the waiting time before the start of the rendering, in order to offer them for example the choice to give up to this option.

Figure 5B:
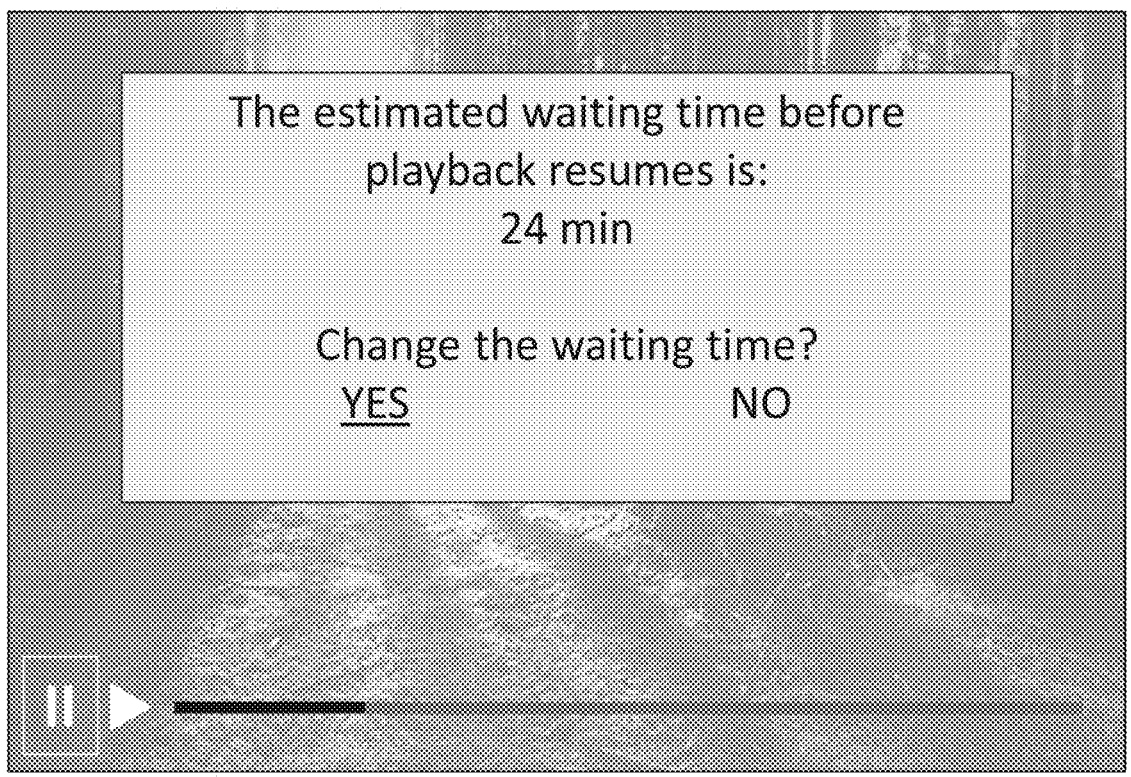
FIG. 5B illustrates an example of display of a request message for selecting a waiting time before resuming the rendering of the digital content broadcast LIVE according to one embodiment of the development.

FIG. 5B shows an example of display of a corresponding information message.

In this example, the message displayed on the screen, for example in the form of a pop-up window via a user interface, informs the user that the rendering of the content C1 will not start until after a 24 minute waiting time. The user, for example using a remote control or via a dedicated application on their smartphone, can choose to respect this pre-configuration and wait 24 minutes, or to give up obtaining maximum quality, and opt for live rendering of the content C1.

Figure 5C:
FIG. 5C illustrates another example of display of a request message for selecting a waiting time before resuming playing the digital content broadcast LIVE according to one embodiment.

In another example, presented in connection with FIG. 5C, it is possible to display on the user interface a message asking the user to indicate how long they are ready to wait before the start of the offline rendering of the content C1. The user can decide to enter manually, for example using a remote control or their smartphone via an application dedicated to controlling the user interface, a pre-storage duration in the buffer memory, before launching the offline rendering. The multimedia stream player then calculates, on the basis of this information entered, the maximum encoding quality of the time segments of the content that it can download to satisfy this constraint, and starts the offline rendering of the content, at the latest after the duration entered by the user.

Figure 6:
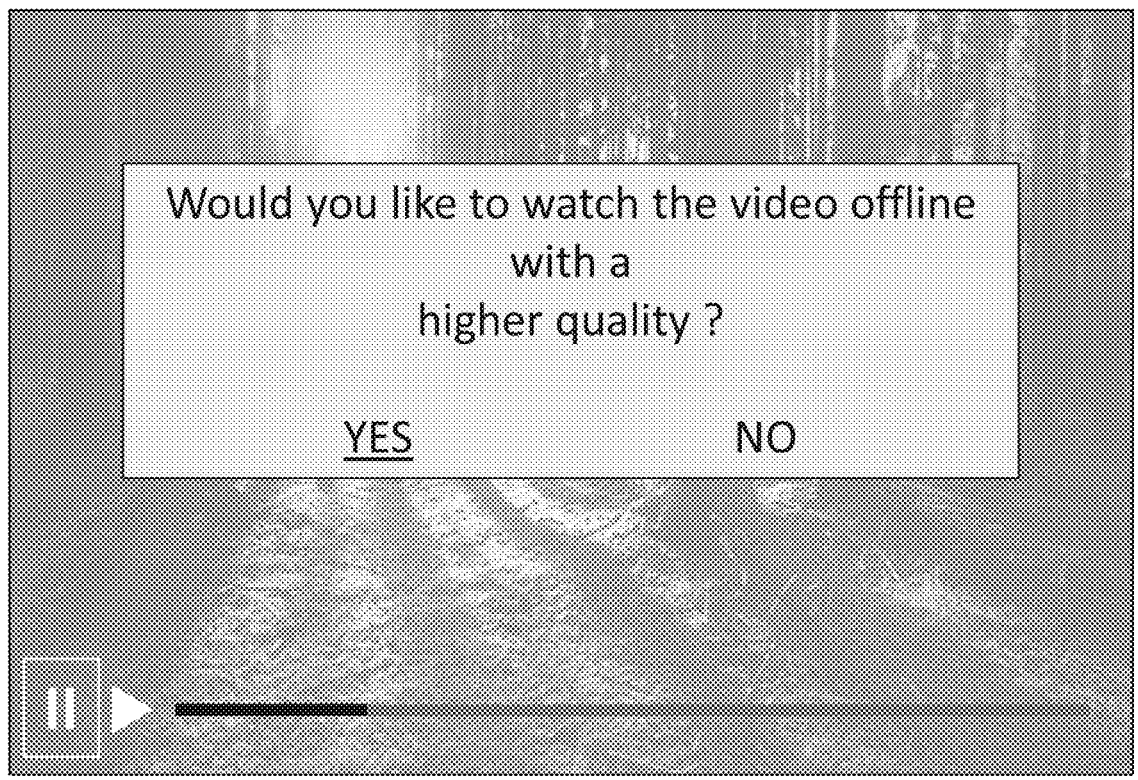
FIG. 6 illustrates an example of display of a message requesting selection of an option of downloading and rendering digital content broadcast LIVE according to one embodiment of the development.

The display of the messages illustrated in FIGS. 5A to 5C can, in one embodiment be preceded by the display of a message as illustrated in FIG. 6, signalling to the user the possibility of selecting at least the option of downloading the time segments at an encoding rate greater than the determined encoding rate and of offline rendering.

The user interface INTF, under control of the module SEL, displays at the user interface a message in the form for example of a pop-up window which appears on the screen. In this example, the message indicates that the content currently being watched is not of the highest quality available, and that the user can, if desired, watch offline at a higher quality. The choice of either one of the first and second options by the user is made for each message display, that is to say for each content being watched.

It is possible to set up a user interface that allows these choices to be configured and not to do so content by content.

In connection with FIG. 7, an example of an interface for pre-configuration of the options for downloading the content according to one embodiment of the development is now presented. In this embodiment, the choice of either one of the first and second options is pre-configured according to one or more contextual components. For example, this choice is active only for certain film type content and not active for other content such as sports, news, etc., at the choice of the user.

This contextual component can be chosen from:
a nature of digital content, such as for example a film, a series, a television programme such as the television news, sports, a documentary etc.

a rendering schedule for digital content, a content duration, a programming of a recurring recording of digital content.

Thus, the user can, depending for example on the nature of the content, decide whether they want all the content of this type to be systematically watched at the best possible quality, which implies that they are sometimes watched offline, depending on the availability of the bandwidth.

In a variant, the user can configure the stream player 9 so that all the content broadcast at a given time is watched later at the best possible quality.

In another variant, the user during the configuration of the programming of a recording of content C1 can configure that this recording will be made at the best possible quality. Thus, the recording of the LIVE content is not subject to fluctuations in bandwidth.

In another variant, the user can decide to configure that all the films are watched later at the best possible quality except those broadcast at a very late hour because the offline watching does not allow to finish watching the film at a time which is decent for the user.

The choice of the user to watch LIVE content C1 in real time at limited quality (first option) or in offline at the best possible quality (second option) is made for example via a user interface offering in the form of a drop-down menu to select a category, a schedule and/or a recording programming for which they wish to opt for the second option 2.

---

ANNEX 1: EXAMPLE OF MANIFEST FILE

---

```
<?xml version="1.0"?>
<MPD xmlns:xsi="http://www.w3.org/2001/XMLSchema-instance"
xmlns="urn:mpeg:DASH:schema:MPD:2011 "
xsi:schemaLocation="urn:mpeg:DASH:schema:MPD:2011 DASH-MPD.xsd"
type="dynamic" profiles="urn:mpeg:dash:profile:isoff-live:2011 ">
<Representation id="0" codecs="avc1" mimeType="Video/mp4"
width="1024" height="768" startWithSAP="1" bandwidth="46986">
<BaseURL>HTTP://server.com/</BaseURL>
<!-- Content C1 at N1=512kb -->
<SegmentBase>
<Initialization sourceURL="Cl_l5sec_512kb/Cl_512kbit_dash.mp4"/>
</SegmentBase>
<SegmentList duration="10">
<SegmentURL media="C1_512kb_1 .mp4"/>
<SegmentURL media=" C1_512kb_2.mp4"/> ....
</SegmentList>
</-- Content C1 at N2=1024kb -->
<SegmentBase>
<Initialization sourceURL="Cl_15sec_500kbit/Cl_1024kbit_dash.mp4"/> </SegmentBase>
<SegmentList duration="10">
<SegmentURL media="C1_512kb_1.mp4"/>....
</SegmentList>
<!-- Content C1 at N3=2048kb -->
<SegmentBase>
<Initialization sourceURL="Cl_l5sec_512kb /Cl_2048kbit_dash.mp4"/> </SegmentBase>
<SegmentList duration="10">
<SegmentURL media="C 1_2048kb_1 .mp4"/>...
</SegmentList>
<!-- Content C2 at N1=512kb -->
<SegmentBase>
<Initialization sourceURL=" C2_15sec_500kbit/C2_512kbit_dash.mp4"/> </SegmentBase>
<SegmentList duration="10">
<SegmentURL media=" C2_512kb_1.mp4"/> ....
</SegmentList>
<!-- Content C2 at N2=1024kb -->
<SegmentBase>
<Initialization sourceURL="C2_15sec_500kbit/Cl_1024kbit_dash.mp4/> </SegmentBase>
<SegmentList duration="10">
<SegmentURL media="C2_1024kb_1 .mp4/>....
</SegmentList>
</- Content C2 at N3=2048kb -->
<SegmentBase>
<Initialization sourceURL="C2_15sec_500kbit/Cl_2048kbit_dash. mp4"/>
</SegmentBase>
<SegmentList duration="10">
<SegmentURL media="C1_2048kbit_1 .mp4/>...
</SegmentList>
....
</SegmentList>
</MPD>
```

---

The invention claimed is:

1. A method for managing adaptive progressive downloading of digital content broadcast in real time, within a multimedia stream player terminal, the method comprising:

obtaining a description file of the digital content, comprising a list of time segments of the digital content to be downloaded each associated with several encoding rates of the digital content;

determining an encoding rate of the time segments to be downloaded for real time rendering of the digital content, according to a resource constraint of the multimedia stream player terminal;

wherein, if the determined encoding rate is less than a maximum encoding rate provided in the description file, implementing a selection of an option:

downloading the time segments at the determined encoding rate and rendering the digital content in real time; or downloading the time segments at an encoding rate higher than the determined encoding rate and rendering the digital content offline;

wherein the selection takes account of contextual information resulting from a choice expressed by a user via an interface of the multimedia stream player terminal; and wherein the option of downloading the time segments at an encoding rate higher than the determined encoding rate and rendering the digital content offline comprises:

a phase of pre-storage of time segments at the higher encoding rate in a buffer memory of the multimedia stream player terminal, for a pre-storage duration, the pre-storage duration being determined so that the buffer memory is empty at an end of the offline rendering;

a joint phase of storage of time segments at the higher encoding rate and offline rendering of the digital content from time segments extracted from the buffer memory, starting at an end of the pre-storage duration; and wherein at least two pre-storage durations are determined for at least two encoding rates higher than the determined encoding rate, the choice of the user comprising a second selection, via the interface, of one of the at least two pre-storage durations.

2. The management method according to claim 1, wherein the contextual information takes account of a contextual component belonging to a group comprising:
   a nature of the digital content;
   a duration of the digital content;
   a schedule for broadcasting the digital content; and
   a programming for recording the digital content.

3. The management method according to claim 1, wherein a determination of the pre-storage duration takes account of at least one parameter belonging to a group comprising:
   the higher encoding rate;
   a duration of the digital content; and
   an instant download rate of the multimedia stream player terminal.

4. The management method according to claim 3, wherein the duration of the digital content is obtained by the multimedia stream player terminal by interrogating a server of program guides which are broadcast in real time.

5. The management method according to claim 1, wherein the higher encoding rate is the maximum encoding rate provided in the description file.

6. A device for managing adaptive progressive downloading of digital content which is broadcast in real time, within a multimedia stream player terminal, the device comprising:
   a module for obtaining a description file of the digital content, comprising a list of time segments of the digital content to be downloaded each associated with several encoding rates of the digital content;
   a second module for determining an encoding rate of the time segments to be downloaded for real time rendering of the digital content, according to a resource constraint of the multimedia stream player terminal; and
   wherein the device comprises a selection module for selecting an option:
      of downloading the time segments at the determined encoding rate and rendering the digital content in real time; or
      of downloading the time segments at an encoding rate higher than the determined encoding rate and rendering the digital content offline,
   and in that the selection module is activated if the determined encoding rate is less than a maximum encoding rate provided in the description file, the selection module taking account of contextual information resulting from a choice expressed by a user via an interface of the multimedia stream player terminal; and
   wherein the selection module being configured to perform the method according to claim 1 for managing adaptive progressive downloading of digital content broadcast in real time within the multimedia stream player terminal.

7. A real time multimedia stream player terminal, wherein the real time multimedia stream player terminal comprises the device for managing adaptive progressive downloading of the digital content broadcast in real time according to claim 6.

8. A non-transitory computer-readable medium, storing code instructions of a computer program causing implementing the method according to claim 1, when the computer program is executed by a processor.

* * * * *